March 27, 1928. 1,664,256
V. LINK
BRAKE
Filed Sept. 4, 1924 6 Sheets-Sheet 6

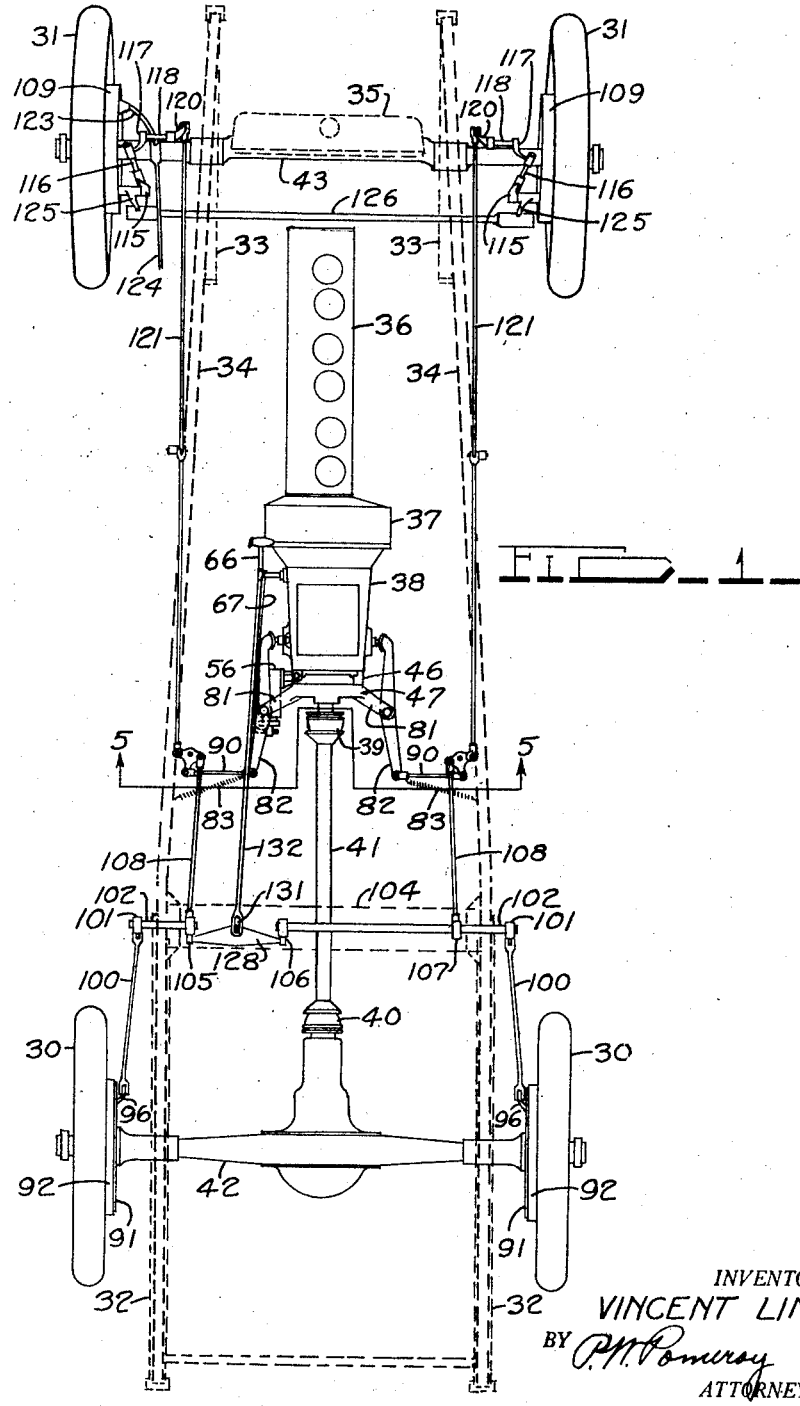

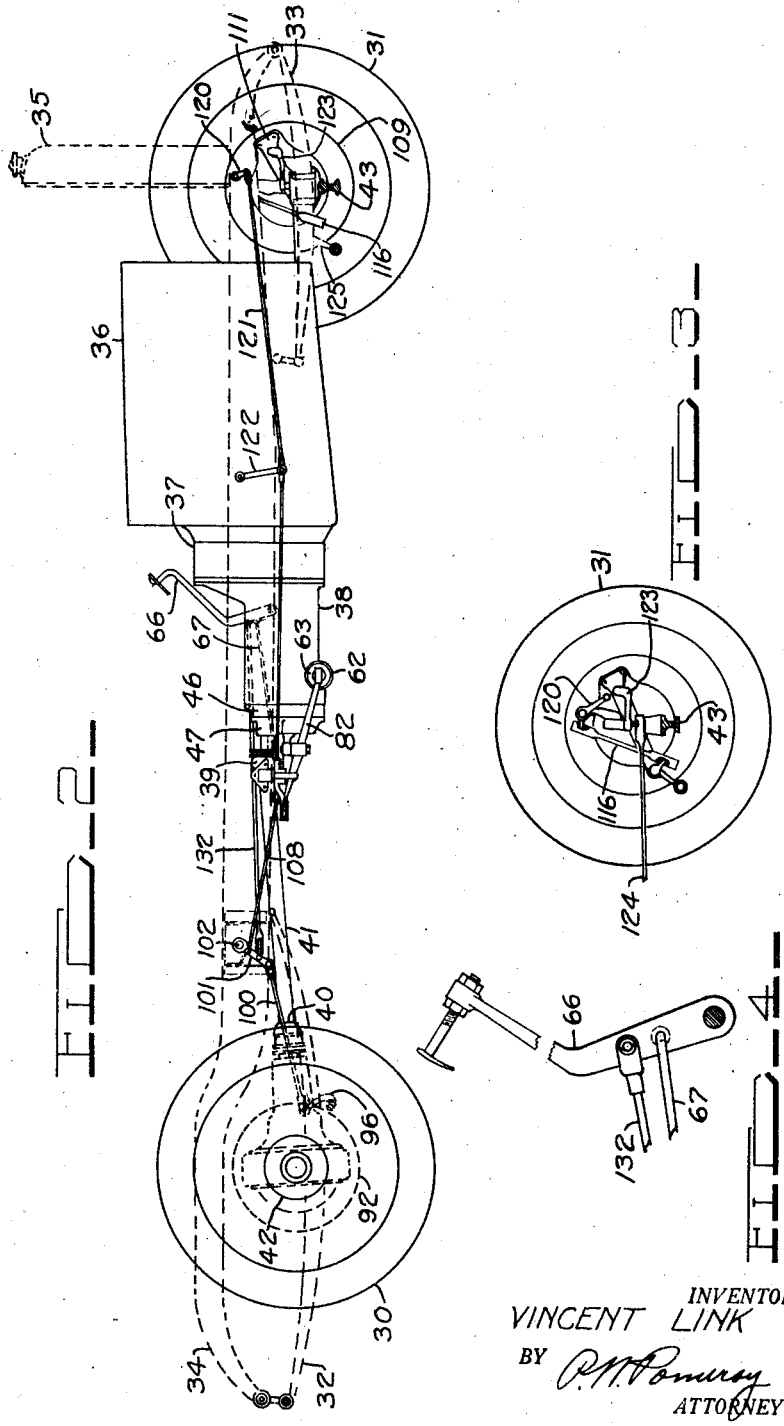

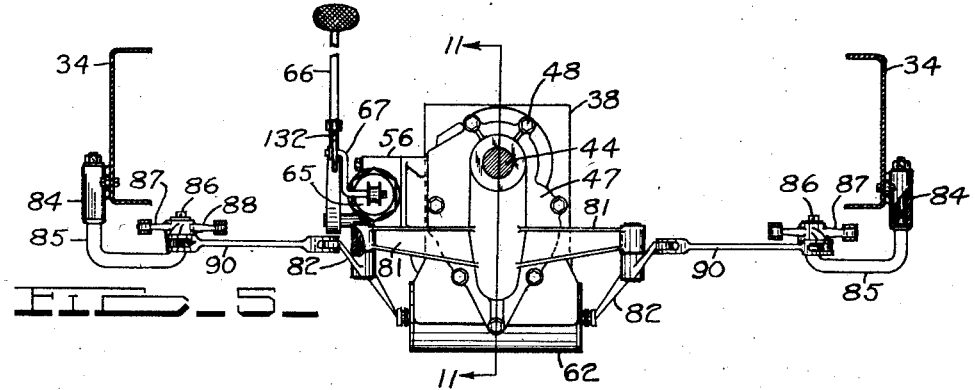
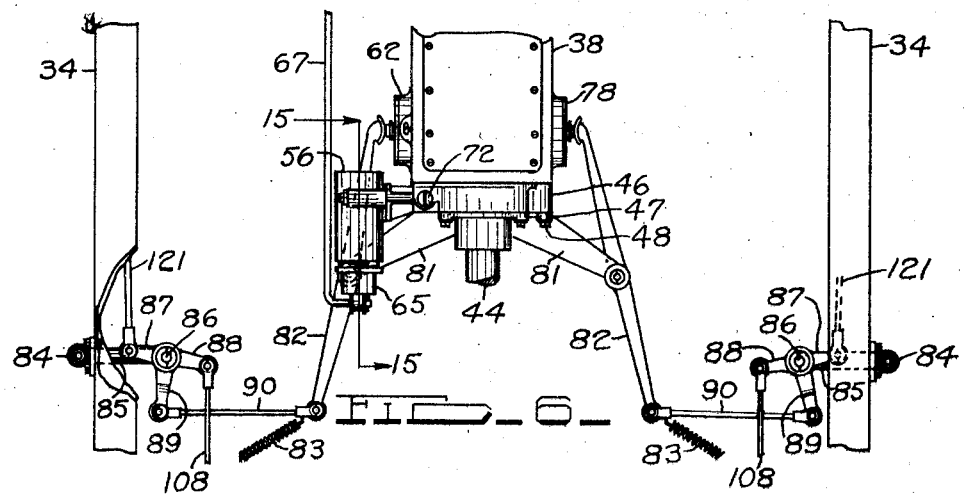
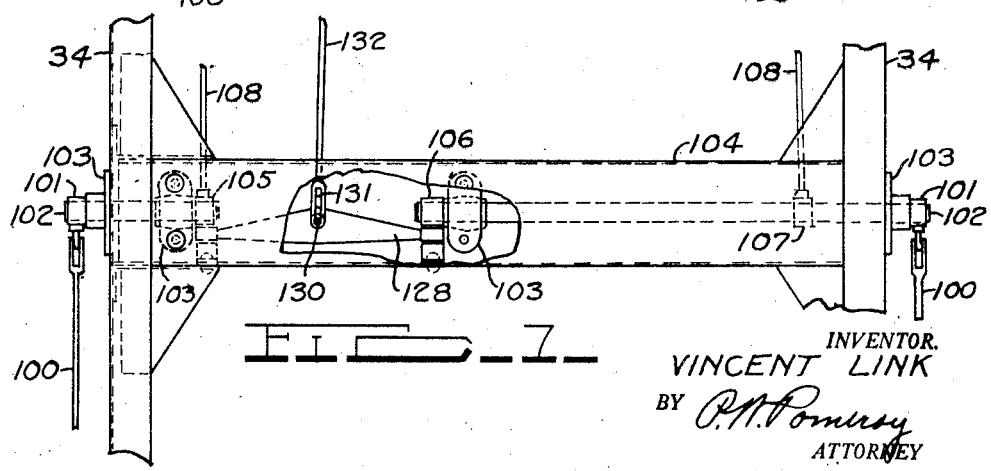

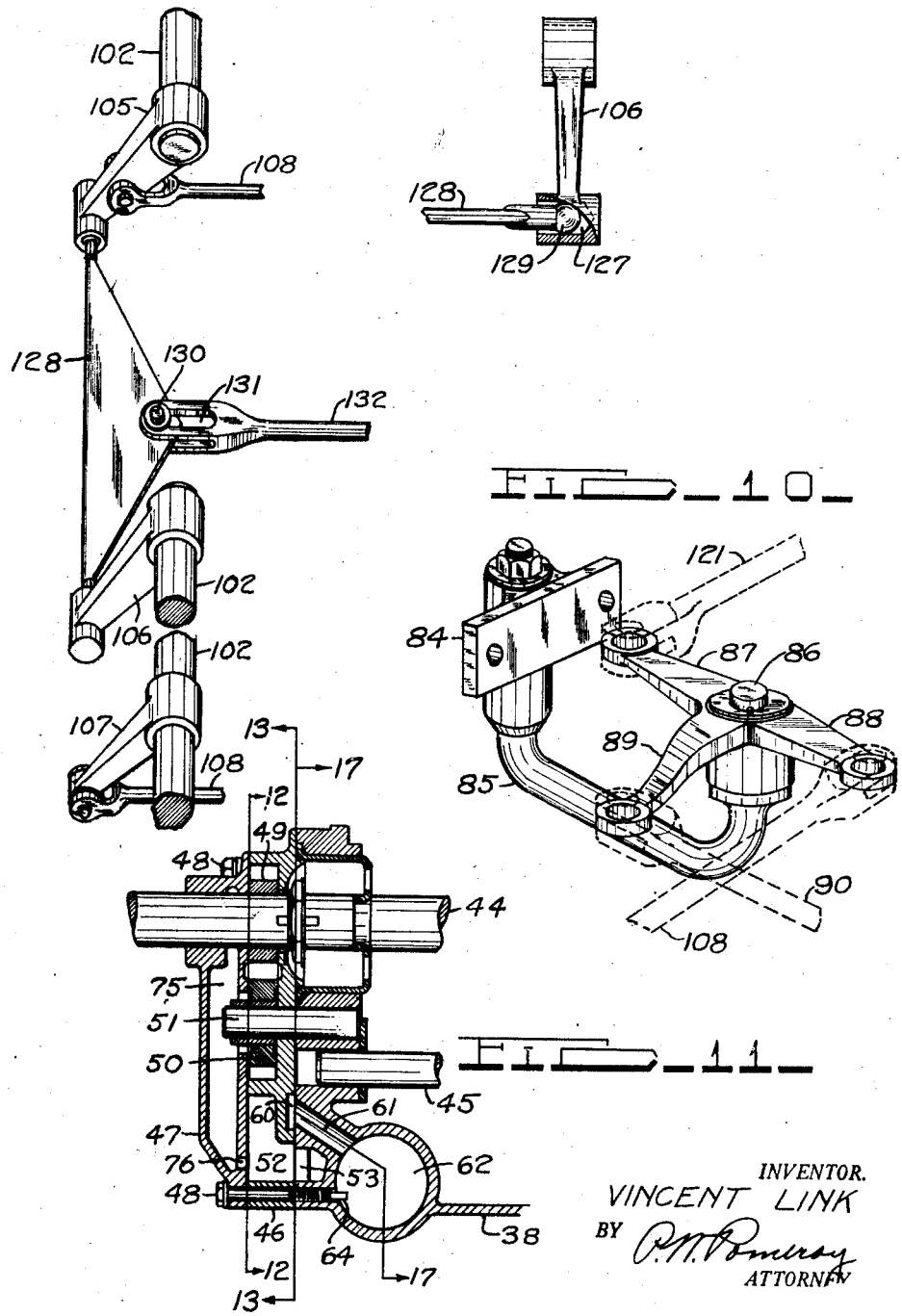

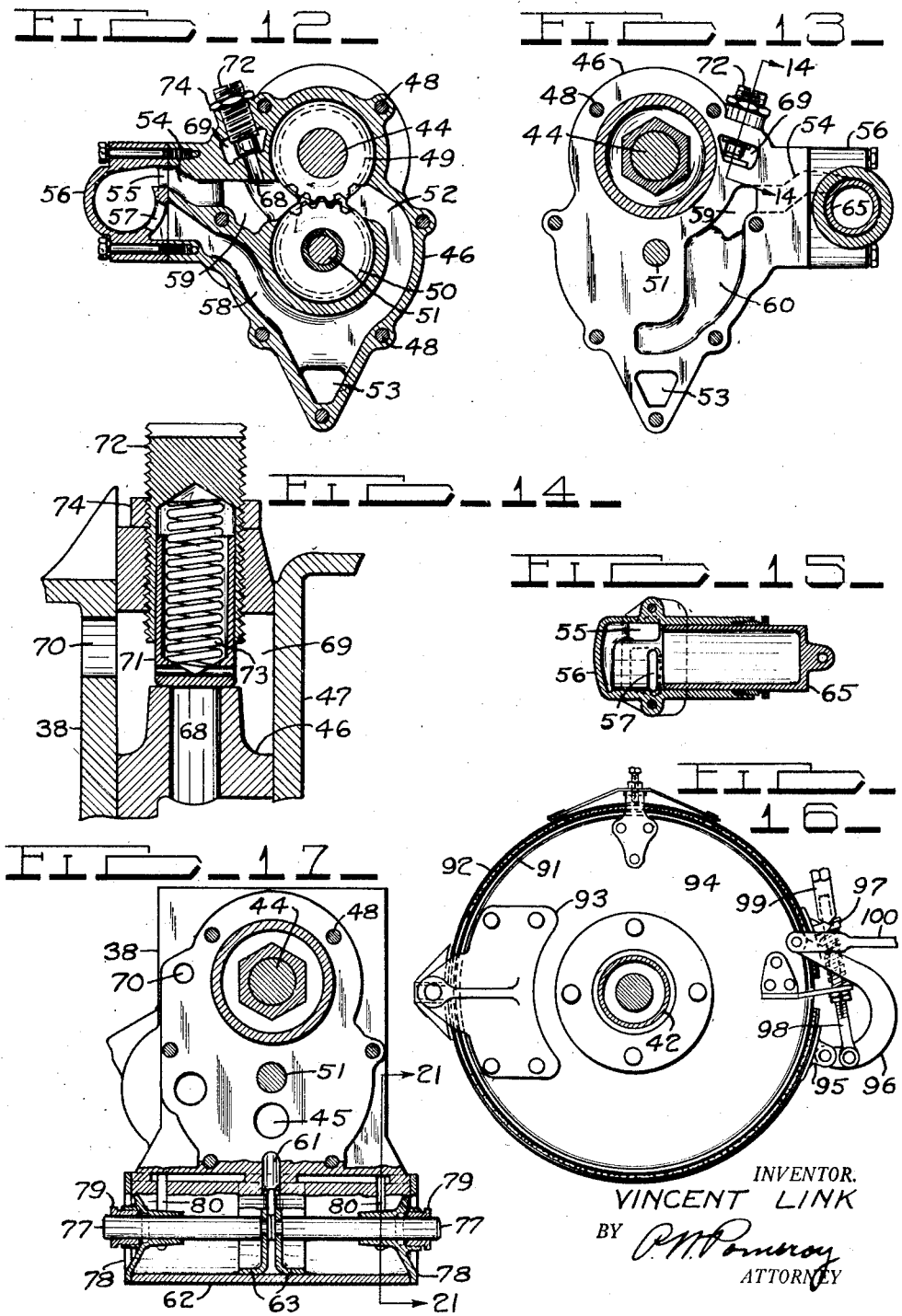

INVENTOR.
VINCENT LINK
BY
ATTORNEY

Patented Mar. 27, 1928.

1,664,256

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed September 4, 1924. Serial No. 735,851.

This invention relates to motor vehicles and particularly to brakes therefor.

It is an object of this invention to provide a braking system for a motor vehicle which will utilize the movement of the vehicle itself for applying the brakes.

Another object is to provide a fluid pump for applying the brakes of a motor vehicle, the movement of the pump being directly dependent upon the movement of the driving wheels of the vehicle.

Another object is to provide a fluid pump, directly or indirectly connected to the driving wheels of a vehicle, which pump is provided with a valve for directing at will the fluid pumped therefrom into a cylinder provided with pistons, causing the pistons to be displaced and to apply the brakes of the vehicle.

Another object is to provide a motor vehicle having a transmission including a main transmission shaft and a casing, a fluid pump operable in direct relationship to the movement of the vehicle driving wheels, a cylinder enclosed by the casing provided with two pistons connected to the vehicle brakes, and a foot controlled valve operating to cause fluid to flow at will from the pump into the cylinder to separate the pistons and apply the brakes.

Another object is to provide such a braking system in which fluid is continuously circulating from the pump through a valve cylinder and back to the pump, the valve being operable by a foot controlled pedal to stop such circulation whereupon the fluid from the pump is caused to flow between two pistons and separate the same, thereby causing the vehicle brakes to be applied.

Another object is to provide a braking system as described above in which there are two fluid operated pistons, each of which is connected to an independent set of brakes.

Another object is to provide a braking system as described above in which there is a cylinder disposed crosswise of the vehicle and in which there are two fluid operated pistons, each piston operating to independently apply the front and rear wheel brakes of the vehicle on its respective side.

Another object is to provide a braking system in which the front and rear wheel brakes on each side of a vehicle are mechanically connected together, separately from the brakes on the other side of the vehicle, and in which a single brake adjustment is provided in the braking mechanism for each side of the vehicle for taking up the wear of both the front and rear brakes on that side of the vehicle.

Another object is to provide a vehicle braking system as described above in which the front and rear wheel brakes on each side are connected to two arms of a three arm floating bell-crank, the third arm of which is connected to the fluid operated piston on that side for causing rotation of the bell crank to apply the brakes.

A further object is to provide a vehicle braking system as described above in which fluid operated means are provided for applying brakes on all four wheels of a vehicle, the means being controlled by a pedal operable at the will of the driver, further means being provided operable by said pedal for applying the rear wheel brakes independently of the fluid operated means.

A still further object is to provide a vehicle braking system in which the fluid from a pump driven in direct relation to the movement of the driving wheels is caused to flow at will by means of a pedal operated valve into a cylinder provided with two pistons movable crosswise of the vehicle, each piston being connected to the front and rear brakes on its respective side of the vehicle through a floating three arm equalizing bell crank, the rear wheels of the vehicle being connected by linkages embodying an equalizing device to the same pedal that operates the valve mentioned so that the rear wheel brakes may be applied in conjunction with or independent of the front wheel brakes and fluid operating means.

The above being among the objects of the present invention, the same consists of certain features of construction and combination of parts to be hereinafter described with reference to the accompanying drawings and then claimed, having the above and other objects in view.

In the accompanying drawings which illustrate a suitable embodiment of the present invention and in which like numerals refer to like parts throughout the several views:

Fig. 1 is a fragmentary plan view of a motor vehicle chassis in which an embodiment of the present invention is incorporated, certain parts thereof being shown by dotted lines.

Fig. 2 is a side view of the chassis shown in Fig. 1, the frame and certain other parts being shown in dotted lines.

Fig. 3 is a side view of one of the front wheels looking from the center of the chassis.

Fig. 4 is a broken side view of the brake operating pedal, showing a fragment of the valve operating rod and rear wheel brake rod secured thereto.

Fig. 5 is an enlarged section taken through the chassis on the line 5—5 of Fig. 1.

Fig. 6 is an enlarged fragmentary plan view of the mechanism shown in Fig. 5.

Fig. 7 is a fragmentary plan view of the brake shaft for the rear wheel brakes and accompanying parts including the equalizer for the rear brakes when they are applied by foot pressure only.

Fig. 8 is a perspective view of the rear brake shaft showing the manner of connecting the rods thereto for operating the rear brakes and the equalizer for equalizing the brake pressure applied by foot pressure only.

Fig. 9 is a partially broken view of one of the levers shown in Fig. 8, illustrating the manner in which the equalizing bar is connected thereto.

Fig. 10 is an enlarged perspective view of the floating three arm bell crank which is utilized in applying and equalizing the pressure to the front and rear wheel brakes.

Fig. 11 is a fragmentary sectional view taken on the line 11—11 of Fig. 5 showing the oil or fluid pump and piston cylinder in connection with the transmission.

Fig. 12 is a section taken on the line 12—12 of Figure 11.

Fig. 13 is a section taken on the line 13—13 of Figure 11.

Fig. 14 is a section through the oil pressure relief valve taken on the line 14—14 of Fig. 13.

Fig. 15 is a section through the control valve and cylinder taken on the line 15—15 of Fig. 6.

Fig. 16 is a side view of one of the rear wheel brake drums showing the brake mechanism in conjunction therewith, looking from the center of the vehicle.

Fig. 17 is a sectional view through the brake operating cylinder and pistons, taken on the line 17—17 of Fig. 11.

Figure 18:
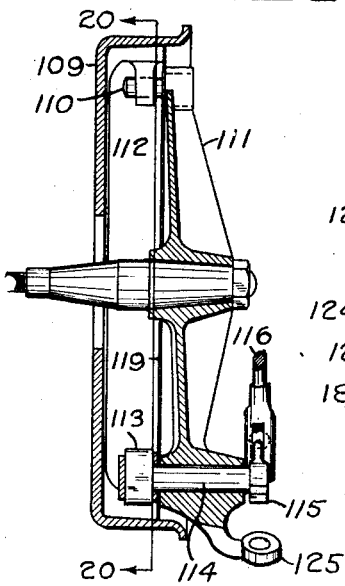
Fig. 18 is a section taken diametrically through one of the front wheel brake drums and its accompanying mechanism corresponding to a section taken on the line 18—18 of Fig. 19.

The drawings show, more or less diagrammatically, a motor vehicle including rear wheels 30, front wheels 31, rear springs 32, front springs 33, frame 34, radiator 35, engine 36, clutch 37, transmission 38, universal joints 39 and 40, propeller shaft 41, rear axle 42 and front axle 43, with other features incorporated therein as will be hereinafter described. As is usual in such vehicles, the rotational movement of the engine 36 is transmitted through the clutch 37, transmission 38, universal joints 39 and 40, propeller shaft 41, the axle shafts of the rear axles 42 to the driving wheels 30. Also, as is usual in such vehicles, the transmission 38 comprises a casing which, for clearness, is also designated as 38, carrying the main transmission shaft 44 and counter shaft 45 (see Figure 11), the universal joint 39 being connected at its forward end to the rear end of the main transmission shaft 44, suitable gears, not shown, being slidably but non-rotatably mounted on the shaft 44 for selective engagement with other gears, not shown, rotatably but not slidably mounted on the countershaft 45, which gears are provided for effecting different ratios of rotation between the engine 36 and the rear wheels 30. Secured to the rear face of the transmission casing 38 is a casing member 46 provided with pockets and passages to be hereinafter described, and a cover member 47 closes the rear face of the casing member 46. Bolts such as 48 pass through the cover member 47 and casing member 46 and thread into the transmission casing 38 for securing the casing member 46 and cover 47 thereto. A gear 49 is non-rotatably secured to the main transmission shaft 44 within a suitable pocket in the casing member 46 and another gear 50, meshing with the gear 49, is rotatably mounted in another pocket in the casing member 46 upon a stub shaft 51 suitably supported by the casing member 46 and transmission case 38. The two gears 49 and 50 form an oil pump of a conventional type which, because of the fact that the gear 49 is non-rotatably secured to the main transmission shaft 44 and in turn is connected to rotate in timed relation to the rotation of the rear wheels 30 by means of the universal joints 39 and 40, propeller shaft 41 and the axle shafts in the rear axle 42, rotates or pumps an amount directly proportional to the speed of rotation of the rear wheels 30.

As shown most clearly in Figure 12 a passage 52 in the casing member 46 leads from the suction side of the gears 49 and 50 to an opening 53 communicating with the interior of the transmission case 38 which is partially filled with oil. A passage 54 also in the pump casing 46 leads from the discharge side of the gears 49 and 50 through an opening 55 in the side of a valve cylinder casing 56 bolted to the side of the pump casing member 46. A second wider opening 57 leads from the interior of the valve cylinder casing 56 to the passage 58 in the pump casing 46 which communicates with the suction passage 52 and opening 53. It will be evident that when the vehicle is in motion, oil continuously circulates from the pump gears 49 and 50, through the passage 54, opening 55, cylinder 56, opening 57, passages 58 and 52 back to the pump gears 49 and 50. A passage 59 leads from the passage 54 to a passage 60 cored in the front face of the pump casing 46 as shown in Figure 13, and the passage 60 leads downwardly and communicates with a passage 61 in the transmission case 38 as shown in Figure 11. The passage 61 leads into the middle of a cylinder 62 formed in the lower part of the transmission case 38 and disposed crosswise thereof. Within the cylinder 62 are disposed two pistons 63 (see Figure 17) which normally lie in the adjacent relationship with their heads slightly separated at the middle of the cylinder 62. An extended end 64 on one of the bolts 48, as shown in Figure 11, projects into the cylinder 62 and acts as a stop for the inward movement of the pistons 63.

The cylinder 56 which is disposed longitudinally of the vehicle and bolted to the pump casing 46, is closed at its forward end and open at its rear end, a piston valve 65 being inserted in the open rear end and being slidable therein. A brake operating pedal 66 of conventional construction is connected by means of a rod 67 to the valve 65. The valve 65 is normally positioned in the cylinder 56 so that it lies back of the openings 55 and 57 and leaves them uncovered so that the oil from the pump may circulate through the cylinder 56 as previously described. Upon forward movement of the pedal 66 it carries the rod 67 and valve 65 forward with it, the valve 65 moving forward to cover or partially cover the opening 57 leading from the cylinder 56 to the passage 58. As soon as the opening 57 is covered or partially covered the passage of the oil to the suction side of the pump gears 59 and 60 is either stopped or restricted, causing a pressure to be built up on the discharge side of the pump. The pressure thus built up forces the oil through the passages 59, 60 and 61 into the cylinder 62, the pressure being transmitted to the inner faces of the pistons 63 and causing them to move outwardly away from each other.

To limit the amount of pressure which may thus be built up and transmitted to the faces of the pistons 63, relief means is provided as follows. A passage 68 is provided in the pump casing 46 leading from the discharge passage 54 to a longitudinally extending passage 69 communicating with an opening 70 leading into the interior of the transmission case 38. Closing the passage 68 is a hollow valve 71, closed at one end, which is axially movable in a hollow screw member 72 threadedly received in the pump casing 46. A coil spring 73 is provided within the valve 71 and screw member 72 for normally holding the valve 71 down on its seat over the passage 68. When the pressure of the oil on the discharge side of the pump becomes great enough to overcome the resistance of the spring 73, the valve 71 is caused to lift from its seat and allow some of the oil to escape through the passage 69 and opening 70 into the transmission case 38, thus relieving the pressure on the discharge side of the pump until it is reduced to a point where the pressure of the spring 73 will again force the valve 71 down on its seat over the passage 68. By threading the member 72 either in or out the pressure at which the valve 71 will lift, and which is consequently the maximum pressure that may be transmitted to the faces of the pistons 63, may be increased or decreased as desired. A lock nut 74 threadably received on the screw member 72 serves to lock the latter in adjusted position.

To prevent the oil under pressure in the pump and different passages in the casing 46 from escaping rearwardly along the main transmission shaft 44, a pocket or passage 75 is cored in the front face of the cover member 47 as shown in Figure 11 and extends around the shaft 44. An opening 76 leads from the passage 75 into the passage 52 so that any oil traveling rearwardly along the transmission shaft 44 will be caught in the pocket 75 and returned to the pump or transmission case 38 through the opening 76 and will not escape into the open.

Each piston 63 is provided with a piston rod 77 which projects outwardly therefrom and whose outer ends are suitably supported by the covers 78 enclosing the outer ends of the cylinder 62 and a suitable packing nut 79 is provided in each cover 78 around the rods 77 to prevent leakage of oil thereby. Openings 80 adjacent the ends of the cylinder 62 connect with the space back of each piston 63 with the interior of the transmission case 38 to allow the oil collected therein to be displaced into the transmission case 38 when the pistons 63 move outwardly.

As particularly shown in Figures 1, 5 and 6, two arms 81 are formed integral with and projecting outwardly and rearwardly from the cover member 47. The end of each arm 81 pivotally supports in a horizontal plane a lever 82 midway its length, the forward ends of the levers 82 being formed with a curved face for sliding contact with the outer ends of the piston rods 77. Springs 83 secured to the rear ends of the lever 82 are suitably anchored to the frame 34 or other suitable part and tend to pull the rear ends of the levers 82 outward and the front ends inward, normally holding the pistons 63 in adjacent relationship at the middle of the cylinder 62.

Secured to each side of the frame 34 in approximately the same longitudinal position of the vehicle as the rear ends of the levers 82, are the brackets 84 which pivotally support in a horizontal plane the arms 85 which extend inwardly therefrom and which terminate in an upwardly extending pin portion 86, the latter of which pivotally receives a bell crank having three arms 87, 88 and 89. The arms 89 are pivotally connected by the rods 90 to the rear ends of the levers 82. Each arm 87 is connected to a brake on the front wheel 31 on its respective side of the vehicle, and each arm 88 is connected to the brake on the rear wheel 30 on its respective side by means which will be presently described.

The rear wheel brakes are illustrated as of the conventional external band type as shown in Figure 16 in which a drum 91 is secured to the wheel 30 and is surrounded by a brakeband 92 normally slightly spaced therefrom. The band 92 is anchored against turning by a bracket 93 secured to a plate 94 which in turn is supported by the rear axle 42. One of the free ends of the band 92 is provided with a bracket 95 to which is pivotally connected the toggle lever 96. Secured to the other of the free ends of the band 92 is the bracket 97 through which the bolt 98 passes and is pivotally connected by its bifurcated end to the toggle lever 96 a short distance from the point of pivot of the latter to the bracket 95. A nut 99 threaded on to the screw 98 above the bracket 97 provides an adjustment for the wear of brake, and, as will subsequently be explained, indirectly provides means for adjusting the wear of the front wheel brake on the same side of the vehicle, thereby providing a single means for adjusting both front and rear brakes simultaneously. It will be apparent that when the upper end of the toggle lever 96 is moved forwardly, or to the right as viewed in Figure 16, the free ends of the band 92 will be caused to approach each other, drawing the band 92 into frictional engagement with the drum 91 and exerting a braking effect on the rear wheel 30. The upper ends of the toggle levers 96 are pivotally connected by the rods 100 to the levers 101 non-rotatably secured to the cross shafts 102 which are supported in brackets 103 beneath the frame cross-member 104 as shown most clearly in Figure 7. The left hand brake shaft 102 projects only a short distance through the frame 34 and the right hand brake shaft 102 extends past the center of the vehicle to a point a short distance from the inner end of the left hand brake shaft 102. Secured to the adjacent inner ends of the shafts 102 are the levers 105 and 106, and another lever 107 is secured to the right hand brake shaft 102 a distance inwardly from the frame 34 corresponding to the distance that the lever 105 is spaced from its corresponding side of the frame 34. Rods 108 pivotally connect the lever 105 with the arm 88 of the three arm bell crank on the left hand side of the vehicle and the lever 107 with the arm 88 of the three arm bell crank on the right hand side of the vehicle.

Figure 19:
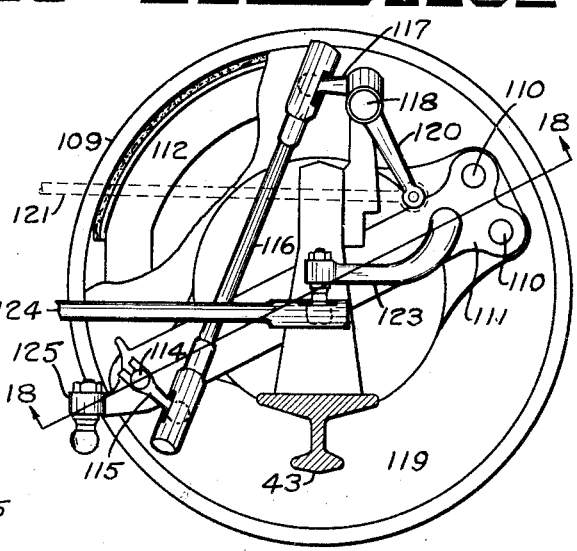
Fig. 19 is a partially broken enlarged view taken from the center of the vehicle of one of the front wheel brake drums showing the front wheel brake mechanism in connection therewith.
Figure 20:
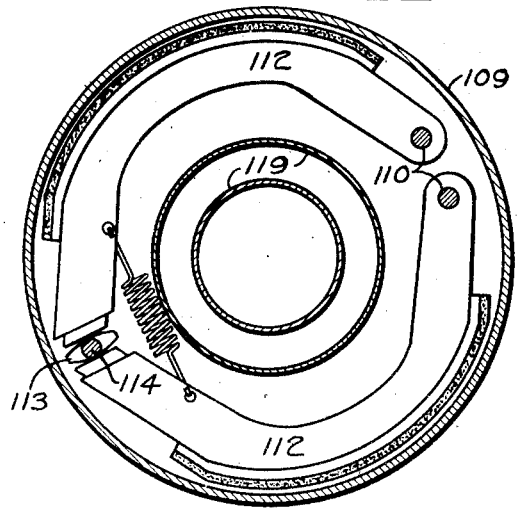
Fig. 20 is a section taken on the line 20—20 of Fig. 18.
Figure 21:
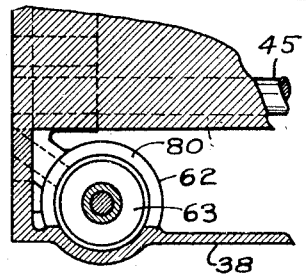
Fig. 21 is a fragmentary section of the transmission case taken on the line 21—21 of Fig. 17.

The front wheels are also provided with brakes of the drum type but, as in the case of the rear wheels, other suitable forms of brakes may be employed. Secured to each wheel 31 is a brake drum 109. Within each brake drum 109 and suitably pivoted on pins 110 (see Figures 18, 19 and 20) projecting from a cross piece 111, preferably integral with the steering knuckle for the front wheel, are the brake shoes 112. Positioned between the free ends of these brake shoes is the cam 113, fast on a shaft 114 journaled in the cross-piece 111 and provided on its inner end with an arm 115. A suitably connecting drag link 116 connects this arm 115 to the ball end of an arm 117 secured to the shaft 118. The ball of the arm 117 operates substantially in the axial line of the vertical pins or trunnions by which the steering spindle is pivoted for horizontal oscillation to the forked end of the front axle 43 in the usual manner, so that oscillation of the front wheel 31, during steering movements of the wheel, does not appreciably change the relationship between the arms 115 and the arms 117 and hence has no effect on the operating cam 113. It is obvious that when the arm 117 is raised, the cam is operated to separate the free ends of the brake shoes 112, forcing them into frictional engagement with the brake drum 109 to effect the desired braking action on the front wheel 31, as is well understood in the art. A dust cover 119, in the form of a circular plate, is secured to the cross-piece 111 and closes the inner open end of the brake drum 109. Secured to the shaft 118 and depending therefrom is an arm 120 which is pivotally connected to the rod 121 which extends rearwardly and is pivotally connected to the arm 87 of the three arm bell crank on its respective side of the vehicle. A lever 122 pivotally connected to the frame 34 and rod 121 midway the length of the latter serves to support the middle portion thereof and to keep it from vibrating.

Referring to an above statement that the nut 99 on the rear wheel brake is the sole means for adjusting both the front and rear wheel brakes on that side of the vehicle, it will be apparent that no means are provided on the front wheel brakes themselves for taking up the wear occurring there. Neither are there any means for adjusting or shortening the length of the rods 100, 108 and 121 extending between and connecting the front and rear wheel brakes thru the three arm equalizing bell crank. Normally there is enough reserve movement of the pistons 63 in the cylinder 62 to compensate for any ordinary wear of the brake band lining which might occur, but should it be found necessary to take up such wear independently of the movement of the pistons 63, the nut 99 may be threaded down further on the bolt 98 to obtain the desired effect on both the front and rear brakes on that side of the vehicle. This is due to the fact that the front wheel and rear wheel brakes on that side of the vehicle are directly connected together thru the three arm bell-crank, the effect being that when one of the brakes is tightened up or adjusted the three arm-bell-crank equalizes the pressure applied to and the effect of such adjustment between such brake and its corresponding front wheel brake. In other words, because the brakes are connected together thru the medium of an equalizing member, any adjustment which will effect one of them must necessarily be split up or equalized between it and its corresponding front or rear wheel brake. This fact is taken advantage of in the construction shown in order to simplify the construction by providing mechanical means for adjustment on the rear wheel brakes only.

An arm 123 extending inwardly and rearwardly from the cross-piece 111 of the left-hand front wheel 31 is connected to the forward end of the rod 124 which at its rear end is connected to a suitable steering gear, not shown in the drawings. The rear ends of the cross-pieces 111 for both front wheels 31 are provided with extensions 125 connected by the usual drag link 126 in order that the front wheels will move in proper relationship to each other when oscillated by the steering gear.

From the foregoing description, it is thought that the operation of the mechanism comprising the present invention will be obvious. When the vehicle is in motion the rotation of the driving wheels 30 will cause the pump gears 49 and 50 to turn in direct relation thereto. The pump gears in turning cause oil to be circulated through the passage 54, opening 55, valve cylinder 56, opening 57, and passages 58 and 52 thus normally providing a free circulation of the fluid. When the pedal 66 is depressed the valve 65 is caused to move forward and close the opening 57, whereupon the oil in the passage 54 is put under pressure and caused to flow through the opening 59 and passages 60 and 61 into the cylinder 62, forcing apart the pistons 63. The piston rods 77 which move outwardly with the pistons 63 force the forward ends of the levers 82 outwardly and draw the rear ends of the same inwardly, which in a like manner draw the rods 90 and bell crank arms 89 inwardly. When the outer ends of the bell crank arms 89 move inwardly the arms 88 are moved forwardly carrying with them the rods 108 which pull the levers 105 and 107 forwardly and rock the shafts 102, which rocking moves the levers 101 forwardly drawing with them the rods 100 and the upper ends of the toggle levers 96, causing the brake bands 92 to engage the drums 91 and exert a braking effect on the rear wheels 30.

In a like manner, when the outer ends of the bell crank arms 89 are drawn inwardly, the outer ends of the bell crank arms 87 are drawn rearwardly, carrying the rods 121 rearwardly with the lower ends of the arms 120, which rocks the shafts 118 and lifts the levers 117 which in turn lift the drag links 116 and arms 115, and rock the cams 113 which spread the shoes 112 into engagement with the front wheel brake drums 109 and exert a braking effect on the front wheels 31.

Should the brakes not be adjusted equally on the front and rear wheels on either side, the floating three arm bell crank previously described will operate to offset such maladjustment and will equalize the pressure applied to both the front and rear wheel brakes. This will be best explained by taking the specific example of a condition where the front wheel brakes take hold sooner than the rear wheel brakes, the latter of which may be considered to be very loosely adjusted. In such a case, when the outer end of the arm 89 of the three arm bell crank is drawn inwardly by the rod 90, all the arms 87, 88, and 89 rotate about the end 86 of the pivoted arm 85. If, as assumed, the front wheel brakes are adjusted tighter than the rear wheel brakes, a resistance to the turning of the bell crank will first be experienced at the outer end of the arm 87 connected to the front wheel brake. This will tend to hold the end of the arm 87 stationary and transfer the point about which the bell crank pivots from the end 86 of the arm 85 to the point of connection between the arm 87 and rod 121, which action is made possible by the fact that the arm 85 is pivotally supported in the bracket 84. As soon as the end of the arm 88 connected to the rear brake rod 108 moves forwardly about the pivot point between the arm 87 and rod 121 a distance sufficient to effect a resistance thereto equal to the resistance applied to the outer end of the arm 87 by the front wheel brake, the point of pivot of the bell crank again returns to the end 86 of the arm 85, and it will be obvious that the pull on the rods 108 and 121 will thereafter be equal, thus equalizing the pressures applied to the front and rear brakes. It is also obvious that the same general action takes place if the rear brakes are adjusted tighter than the front brakes, thus assuring equal pressures on the front and rear brakes on each side of the vehicle in spite of any inequality in the adjustment of these brakes. Inasmuch as the pressure applied to both pistons 63 is the same, it is apparent that the pressure applied to the brakes on both sides of the vehicle is the same, and consequently the same presure is applied to all the brakes.

It is desirable in obtaining the proper steering effect of the vehicle and for other well known reasons, that less braking effect be applied to the front wheels than the rear wheels. This effect is obtained in the construction shown, although other means may be used, by providing internal brakes on the front wheels and external brakes on the rear wheels. It is common knowledge that for braking surfaces of a given size, external brakes exert roughly forty per cent greater braking effect for the same actuating pressure than do internal brakes. In the construction shown the front and rear brake drums are of the same size, with the result that inasmuch as the same pressure is applied to all the brakes, the braking effect to which the front wheels are subjected is considerably less than the braking effect on the rear wheels.

It is also preferable in such a construction that provisions be made to allow a certain amount of leakage from the pressure side of the pump gears 49 and 50 when the valve 65 has completely covered the port or opening 57. This is for the purpose of preventing locking of the rear or driving wheels and such immunity from locking results due to the fact that as soon as the brakes are applied severely enough to materially reduce the speed of rotation of the driving wheels 30, the speed of rotation of the pump gears 49 and 50 is correspondingly reduced, pumping a correspondingly lesser volume of oil. It is evident that if no oil could escape from the pressure side of the gears 49 and 50 when the valve 65 covers the port 57, the pressure might be built up to a point where the rear wheels 30 might be locked by their brakes, but if means are provided for letting a small amount of oil leak out under such conditions it will be impossible to lock the rear wheels due to the constant relieving of the pressure on the pistons 63 which correspondingly relieves the pressure on the brakes. Such leakage may be accomplished by providing a relatively loose fit of the gears 49 and 50 in the housing 46, or by any other suitable method too apparent to be dwelt upon. It is readily seen that if, because of such leakage as described, it is impossible to lock the rear wheels 30, it is more impossible to lock the front wheels 31 upon which a lesser braking effect is applied as previously described, thus eliminating one of the most dangerous features of the conventional designs of front wheel brakes.

It will be apparent from a study of the foregoing description that the gears 49 and 50 which are connected to turn in direct relationship with the rear wheels 30, will pump oil only when the vehicle is moving in a forwardly direction, and because of the leakage previously described would not effectually bring the vehicle to a dead stop. This difficulty might be remedied by driving the pump from the engine 36 independently of the rear wheels 30, but in such a construction the undersirable features necessarily involved would more than offset the advantage gained. To retain the advantages of the system described and overcome the disadvantages above described, additional means are provided as follows: The free ends of the levers 105 and 106 secured to the inner adjacent ends of the brake cross shafts 102 (see Figure 8) are provided with sockets 127 (see Figure 9). An equalizing bar 128 provided with ball ends 129 which are adapted to seat in the sockets 127 and have universal movement therein connects the free ends of the levers 105 and 106. A pin 130 vertically disposed in the equalizing bar 128 midway its length is provided for pivotal and sliding connection in the slot 131 of the rod 132 which extends forwardly therefrom and is pivotally connected at its forward end to the brake pedal 66 just above the point of connection of the valve operating rod 67 therewith. It is apparent, therefore, that when the pedal 66 is depressed the rod 132 pulls the equalizing bar 128 and levers 105 and 106 forward, rocking the shafts 102 and consequently applying the rear wheel brakes, the pressure upon which is equalized through the bar 128 in a manner too well known to require further mention. When the bar 128 is pulled forward, rocking the shafts 102 it is evident that the rods 108 which are connected to the shafts 102 by the levers 105 and 107 will also move forward. In moving forward, however, the rods 108 which are connected at their forward ends to the arms 88 of the three arm bell cranks do not apply the front wheel brakes to any extent, if at all as might be expected, because the bell crank as a whole moves forward an amount corresponding to the forward movement of the rod 132 by swinging on the arms 85 about the latter's point of pivot in the brackets 84, the only resistance offered to such forward swinging being the energy necessary to overcome the tension of the springs 83.

In the arrangement of the parts as shown in the drawing, when the vehicle operator places his foot on the pedal 66 and depresses it or forces it forward the first two inches, more or less, of pedal travel will cause the valve 65 to completely cover the port 57, thus placing the hydraulic brake operating means in full brake applied position. This is approximately, and is intended to be, the amount of pedal travel necessary to take up the normal clearance between brake drum 91 and the brake band 92 due to the action of the foot pressure only on the pedal 66 independently of the hydraulic mechanism. Inasmuch as no substantial braking effect will be apparent due solely to the foot pressure applied to the pedal 66 until after the clearance between the drum 91 and the band 92 has been taken up, the first part of the travel or depression of the pedal 66 will apply the brakes thru the hydraulic mechanism only, but in doing so will prepare the mechanism so that a relatively small further movement will be necessary to also apply the rear brakes by foot pressure. In other words, assuming that the vehicle is moving forwardly and the pedal 66 is depressed an amount to apply the hydraulic mechanism to its fullest extent, say two inches, all four wheels will be braked, and if the pedal 66 is then depressed further, the pressure of the operator's foot on the pedal 66 will be transmitted to and will act to apply further braking effect on the rear wheel brakes. If the vehicle is moving rearwardly, at which time the hydraulic mechanism is inoperative as previously described the first movement of the pedal 66 which acts to apply the hydraulic mechanism will not be lost, but will operate to take up the clearance between the drum 91 and band 92 in exactly the same manner as in the conventional constructions. In this manner subsequent action of the two braking systems is accomplished with the same pedal travel utilized in the conventional constructions.

The pressure on the pistons 63 which is built up on the discharge side of the gears 49 and 50 may be varied at will by means of the pedal 66, which operates the valve 65 to cover the port opening 57 in the cylinder 56. Due to the fact that the cross sectional area of the piston 65 is at all times exposed to the pressure built up on the discharge side of the pump gears 49 and 50, which pressure is transmitted through the rod 67 to the pedal 66, the driver of the vehicle is always aware, by the resistance offered to moving the pedal 66 forward, of the pressure applied to the pistons 63 and consequently the brakes. This gives the driver the same "feel" of the brakes as is present in the conventional brakes applied solely by the pressure of the driver's foot. When the pedal 66 is allowed to return to normal or non-braking position it is evident that a small amount of time will be required for the brake mechanism to return to normal position due to the fact that a short period of time will be consumed in forcing the oil from between the pistons 63 because of the pressure exerted on the levers 82 by the springs 83. The displacing of the oil between the pistons 63 of course has nothing to do with the return of the valve 65 to normal position which may immediately follow the pedal 66 back to normal position. The slot 131 in the rod 132 running to the equalizer bar 128 lets the pin 130 move forwardly in the same and allows the pedal 66 to return immediately to normal position independently of the slower return of the rest of the braking mechanism. Furthermore, it will be apparent from the foregoing without further explanation that when the vehicle is moving forwardly at such a very low rate of speed that the leakage in the pumping system exceeds or is equal to the volume of oil being pumped, or when the vehicle is moving rearwardly at which time there is no oil pumped at all, and the pedal 66 is depressed to apply the rear wheel brakes only, the pistons 63 will not be displaced at all and the forward ends of the levers 82 will simply lift away from the ends of the piston rods 77 and will return immediately to normal position as will the rest of the mechanism affected as soon as the pedal 66 is allowed to return to normal position.

Formal changes may be made in the specific embodiment of the invention described without departing from the spirit and substance of the broad invention, the scope of which is commensurate with the appended claims.

What I claim is:—

1. In a motor vehicle having front and rear wheel brakes, a plurality of links connecting each front wheel brake for operation with its corresponding rear wheel brake, said link connection being independent of the brake connection on the opposite side of the vehicle, fluid pressure means operated by the motion of the vehicle, and mechanical means connecting said fluid pressure means with said links to apply said brakes and equalize the brake pressure between each front wheel brake and its corresponding rear wheel brake.

2. In a motor vehicle having front and rear wheel brakes, a plurality of links connecting each front wheel brake with its corresponding rear wheel brake independently of the brakes on the other side of the vehicle, means connecting the ends of said links intermediate said brakes for equalizing the brake pressure between each front wheel and its corresponding rear wheel, and fluid pressure means operative by the motion of the vehicle for operating said links.

3. In a motor vehicle having front and rear wheel brakes, rods connecting each front wheel brake with its corresponding rear wheel brake independently of the brakes on the other side of the vehicle, and fluid pressure means operative by the motion of the vehicle for operating and equalizing the pressure between each of said brakes on the respective sides of the vehicle.

4. In a motor vehicle having front and rear wheels, brakes for said wheels, the brake for each of said front wheels being connected by a plurality of rods to the brake on the rear wheel on the corresponding side of the vehicle independently of the brakes on the other side of the vehicle, means connecting the ends of said rods intermediate said brakes for equalizing the pressure applied to the front and rear wheel brakes on each side of the vehicle, and fluid pressure means operative by the motion of the vehicle for operating and equalizing the pressure applied to said rods between each of said front and rear wheel brakes.

5. In a vehicle provided with front and rear wheel brakes, mechanical connections between each front wheel brake and the rear wheel brake on the corresponding side of the vehicle, and non-connected but dependently actuated fluid pressure means for actuating said mechanical connections to apply said brakes.

6. In combination with a vehicle having front and rear wheel brakes, means on each side of said vehicle independent of each other for operatively connecting each front wheel brake with its respective rear wheel brake, and non-connected but dependently operated hydraulically actuated means connecting said first mentioned means for operating all of said brakes.

7. In combination with a motor vehicle having front and rear wheels, brakes for said wheels, mechanical connections between each front wheel brake and the rear wheel brake on the corresponding side of the vehicle, a cylinder, two oppositely disposed pistons therein, each piston having mechanical connection with said mechanical connections between the said front and rear wheel brakes on each side of said vehicle, and fluid pumping means operable in direct relation to the movement of said rear wheels for causing movement of said pistons and actuation of said brakes.

8. In a motor vehicle having front and rear wheel brakes, each front wheel brake being connected to the rear wheel brake on the corresponding side of the vehicle independently of the brakes on the other side of the vehicle, a cylinder, two oppositely disposed pistons within said cylinder, each of which is operatively connected to the brake connections on its respective side of the vehicle, and a pump driven in direct relation to the speed of rotation of the rear wheels for forcing a fluid between said pistons to separate them and actuate said brakes.

9. In a motor vehicle having front and rear wheel brakes, a cylinder disposed crosswise of said vehicle, opposed pistons in said cylinders, one piston being operatively connected to the front and rear wheel brakes on one side of the vehicle and the other piston being operatively connected to the front and rear wheel brakes on the other side, and pumping means driven in direct relation to the speed of rotation of the driving wheels of the vehicle for causing said pistons to be separated and to apply said brakes.

10. In combination with a motor vehicle having front and rear wheel brakes and a frame, an arm pivotally supported on each side member of said frame, a three arm bell crank mounted on the free ends of said arms, connections between each of said rear wheel brakes and an arm of the said bell crank on the corresponding side of said frame, connections between each of said front wheel brakes and another arm of the said bell crank on the corresponding side of said frame, and means for applying equalized pressure to the third arms of said bell cranks to oscillate the same and actuate said brakes.

11. In combination with a vehicle having front and rear wheel brakes, a pivotally supported arm on each side of said vehicle, a member pivotally connected to the free end of each of said pivoted arms, connections between each of said members and the front and rear wheel brakes on the coresponding side of the vehicle, and means for causing oscillation of said members.

12. In combination with a vehicle having a frame and front and rear wheel brakes, a member pivoted to swing on each side of said frame, a three armed bell crank pivoted to the free end of each of said members, connections between each rear wheel brake and one arm of the bell crank on the corresponding side of the vehicle, connections between each front wheel brake and a second arm of the bell crank on the corresponding side of the vehicle, and connections to the third arm of said bell cranks whereby rotative movement may be imparted to the latter.

13. In combination with a vehicle having front and rear wheel brakes, each front wheel brake being operatively connected to the rear wheel brake on the same side of the vehicle but not connected to each other, a floating bell crank in each of said connections rotation of which acts to apply said brakes, a fluid actuated piston operatively connected to each of said bell cranks, and means for applying fluid pressure to said pistons to displace the same and cause rotation of said bell cranks.

14. In a motor vehicle having front and rear wheel brakes and a transmission case, a cylinder formed integral with and crosswise of said transmission case, opposed pistons within said cylinder, connections between each piston and the front and rear wheel brakes on the corresponding side of the vehicle, pumping means operable in direct relationship to the movement of the rear wheels of said vehicle, and means for causing said pumping means to separate said pistons and actuate said brakes.

15. In a motor vehicle having front and rear wheel brakes and a transmission case, each front wheel brake being connected to the rear wheel brake on the corresponding side of the vehicle, a cylinder integral with and crosswise of the transmission case, opposed pistons in said cylinder, means for separating said pistons by fluid pressure, piston rods movable with said pistons, and a pivotally supported lever operable by each of said rods, each of said levers being connected to the said connections between the front and rear wheel brake on its corresponding side of the vehicle.

16. In a motor vehicle having front and rear wheel brakes, a single fluid pressure operated piston for operating each front wheel brake and the corresponding rear wheel brake, and mechanically operated means for applying the rear wheel brakes only.

17. In a motor vehicle having front and rear wheel brakes, a fluid pressure actuated piston for applying both brakes on one side of the vehicle, a second fluid pressure actuated piston for applying both brakes on the other side of the vehicle, and mechanical means for applying both rear wheel brakes independently of said pistons.

18. In motor vehicle having front and rear wheel brakes, a fluid pressure actuated piston for applying both brakes on one side of the vehicle, a second fluid pressure actuated piston for applying both brakes on the other side of said vehicle, a pedal controlled valve for controlling the pressure applied to said pistons, mechanical means for applying both rear wheel brakes independently of said pistons, said mechanical means and said pedal controlled valve being connected to a single pedal, movement of which operates to apply said rear wheel brakes through said mechanical means and to operate said valve to apply pressure to said pistons and actuate all of said brakes.

19. In a motor vehicle having front and rear wheel brakes, a fluid actuated piston for applying the front and rear brakes on one side of the vehicle, a fluid actuated piston for applying the front and rear wheel brakes on the other side of said vehicle, means for equalizing the pressure applied to each front wheel brake and its corresponding rear wheel brake, means for equalizing the pressure on both pistons, connections between said rear wheel brakes, mechanical means for moving said connections for applying said rear wheel brakes, means in said connections for equalizing the braking pressure from said mechanical means to said rear wheel brakes, and a single pedal, movement of which acts to simultaneously cause said brakes to be applied by said mechanical means and by said pistons.

20. In a four-wheel brake system for motor vehicles, the combination, with the front and rear wheels and their individual brakes of hydraulic cylinder and plunger mechanism comprising a cylinder disposed crosswise of said vehicle, two oppositely disposed plungers in said cylinder, connections between the brakes on one side of said vehicle with one of said plungers and connections beween the brakes on the other side of said vehicle with the other of said plungers for automatically actuating all of said brakes, means for supplying pressure fluid to said plungers, a valve for controlling the fluid supply, a pedal for operating said valve, and means whereby movement of said pedal also acts to apply both said rear wheel brakes by foot pressure independently of said hydraulic mechanism.

21. In a four wheel brake system for motor vehicles, the combination with the front and rear wheels and their individual brakes, of hydraulic cylinder and plunger mechanism, said mechanism comprising two hydraulically operable plungers, connections between one of said plungers and the front and rear wheel brakes on one side of said vehicle, connections between the other of said plungers and the front and rear wheel brakes on the other side of said vehicle, means for supplying fluid pressure to said plungers, a valve for controlling the fluid supply, a pedal for operating said valve, and a lost motion connection between said pedal and both of said rear wheel brakes whereby said rear wheel brakes may be actuated independently of said plungers.

22. In a motor vehicle provided with an encased transmission and driving wheels operatively connected thereto, a fluid carried in said transmission case, a gear pump driven in direct relation to the speed of rotation of said driving wheels for continuously circulating said fluid when said vehicle is in forward motion, a cylinder integral with and crosswise of said transmission case, pistons in said cylinder, a valve cylinder through which said fluid circulates provided with an inlet port and an outlet port, and a foot controlled valve operable to close said outlet port and cause said fluid to enter said first mentioned cylinder to separate said pistons.

23. In a motor vehicle provided with driving wheels and a transmission, said transmission including a case carrying oil and a shaft adapted to rotate in timed relation to said driving wheels, a pump case secured to the rear face of said transmission case, a gear pump housed in said pump case driven by said shaft, a valve cylinder secured to said pump casing, ports in the walls of said valve cylinder through which said oil is continuously circulated by said pump when said vehicle is in forward motion, a valve in said valve cylinder operable to close one of said ports, a piston cylinder disposed crosswise of said transmission case, pistons in said piston cylinder, a passage from said pump to said piston cylinder, and means for moving said valve to restrict said circulation whereby said oil is caused to exert a pressure upon said pistons to separate the same.

24. In combination with a motor vehicle having a transmission including a case and a shaft driven in timed relation to the driving wheels, a housing secured to said case, a gear pump enclosed therein driven by said shaft, said pump continuously circulating oil when said vehicle is in forward motion, a valve cylinder secured to said housing longitudinally of said vehicle, passages in said cylinder for circulation of said oil, said cylinder being closed at its forward end and open at its rear end, a piston valve operable in said cylinder to close certain of said passages upon a forward movement of the same, a foot controlled pedal operable to control the position of said valve, a piston cylinder provided with opposed pistons to operate front and rear wheel brakes on said vehicle, and a passage from said pump to said piston cylinder.

25. In a motor vehicle provided with driving wheels, having brakes thereon and a transmission, said transmission comprising a case enclosing a shaft which rotates in timed relation to said driving wheels, a fluid supply, a housing secured to the rear face of said case, a pump in said housing, a valve cylinder secured to said housing, a passage from said pump leading to a port in said valve cylinder, a second port in said valve cylinder connecting with a passage communicating with said reservoir, a passage connecting said reservoir with said pump, a brake cylinder disposed crosswise of said vehicle, oppositely disposed pistons in said brake cylinder, a passage from said pump to said cylinder, means for restricting said second port in said valve cylinder whereby fluid pressure is built up by said pump and communicated to the faces of said pistons to separate them, and connections between each of said pistons and the brakes on the corresponding side of said vehicle whereby outward movement of said pistons applies said brakes.

26. The combination with a vehicle having a front wheel brake mechanically connected to a rear wheel brake, of a single adjusting means for adjusting said front and rear wheel brakes independently of the brakes on the opposite side of the vehicle.

27. In combination with a motor vehicle having front and rear wheel brakes, each front wheel brake being mechanically connected for operation with its corresponding rear wheel brake independently of the brakes on the opposite side of the vehicle, and single means for adjusting both brakes on each side of said vehicle.

28. In combination with a motor vehicle having front and rear wheel brakes, each front wheel brake being mechanically connected for operation with its corresponding rear wheel brake independently of the brakes on the opposite side of the vehicle, adjusting means for one brake on each side of said vehicle, and means whereby adjustment of said adjusting means operates to adjust both brakes on the same side of said vehicle.

29. In combination with a motor vehicle having front and rear wheel brakes, mechanical connections between each front wheel brake and the rear wheel brake on the corresponding side of the vehicle, screw means for taking up the wear of one of said brakes, and means in said connections comprising an equalizing means for transmitting a proportionate share of such taking up of said brake to the other of said brakes.

30. In combination with a vehicle having front and rear wheel braking means, a lever pivotally mounted between its ends positioned between said front and rear wheel braking means, one end of said lever being connected to said forward braking means and the other end of said rear braking means, said lever being bodily shiftable between said means, and means for causing rotative movement of said lever.

31. In combination with a vehicle having front and rear wheel brakes, a lever pivotally mounted between its ends positioned between said brakes, means for connecting one end of said lever to said front wheel brake, means for connecting the other end of said lever to said rear wheel brake, a pivotal mounting for said lever whereby it may be shifted bodily either forwardly or rearwardly, a second lever non-rotatable in respect to said first lever, and means for controlling the rotative position of said second lever.

32. In combination with a vehicle having a front and a rear wheel brake, a lever pivoted about a vertical line between its ends, said lever being positioned between said brakes and mounted to be bodily movable forwardly and rearwardly, means connecting one end of said lever to said front wheel brake and the other end to said rear wheel brake, and means for imparting rotative movement to said lever.

33. The combination with a vehicle having a front wheel provided with a brake mechanically connected to a brake on a rear wheel, of means supported at one of said wheels for adjusting said brakes on said front and rear wheels.

Signed by me at Detroit, Michigan, U. S. A., this 26th day of August 1924.

VINCENT LINK.